United States Patent [19]

Wieder et al.

[11] Patent Number: 5,190,426
[45] Date of Patent: Mar. 2, 1993

[54] CONCRETE FASTENER

[75] Inventors: Alicia Wieder, Willowbrook; Ralph D. Tenuta, Mt. Prospect; Martin J. Nilsen, Hampshire, all of Ill.

[73] Assignee: Illinois Tool Works Inc., Glenview, Ill.

[21] Appl. No.: 844,201

[22] Filed: Mar. 2, 1992

[51] Int. Cl.$^5$ .............................................. F16B 35/04
[52] U.S. Cl. .................................... 411/412; 411/386; 411/426
[58] Field of Search ............... 411/387, 386, 426, 412, 411/413, 411, 424, 307, 308

[56] References Cited

U.S. PATENT DOCUMENTS

| Re. 28,111 | 8/1974 | Laverty | 411/412 |
| 3,861,269 | 1/1975 | Laverty | 411/413 |
| 4,034,641 | 7/1977 | Williams, Jr. et al. | 411/387 |
| 4,439,077 | 3/1984 | Godsted | 411/412 X |
| 5,061,136 | 10/1991 | Dixon et al. | 411/426 X |

FOREIGN PATENT DOCUMENTS 281203 9/1988 European Pat. Off. ............ 411/413

Primary Examiner—Rodney M. Lindsey
Attorney, Agent, or Firm—Schwartz & Weinrieb

[57] ABSTRACT

A fastener for securing fixtures to concrete or masonry. The fastener includes a dual-thread first stage for engaging a bore in the concrete and stabilizing and centering the fastener as it taps its way into the bore. A single-thread second stage has a pitch larger than the threads of the first stage for receiving particulate cut from the bore so that the particulate will not interfere with driving the fastener completely into the bore.

18 Claims, 1 Drawing Sheet 5,190,426

CONCRETE FASTENER

FIELD OF THE INVENTION

The present invention relates generally to an improved fastener useful for attaching objects to a structure composed of a solid, hard material, such as concrete and the like. More specifically, the invention relates to an improved construction of a concrete or masonry fastener, which is significant improvement over the construction disclosed in the patent of Ernst, U.S. Pat. No. 3,937,119, assigned to the assignee of the present invention.

BACKGROUND OF THE INVENTION

Various constructions of fasteners adapted for different purposes are quite well known in the relevant art, as is evident, for example, by the following patents.

| Siebol et al. | 3,739,682 | 06/19/73 |
| Laverty | 3,861,269 | 01/21/75 |
| Yotti | 3,902,399 | 09/02/75 |
| Shimizu et al. | 4,241,638 | 12/03/80 |
| Shimizu et al. | 4,329,099 | 05/11/82 |
| Barth et al. | 4,576,534 | 03/18/86 |
| Brandt | 4,655,661 | 04/07/87 |
| Kawashita | 4,874,278 | 10/17/89 |

OBJECTS AND SUMMARY OF THE INVENTION

A general object of the present invention is to provide a new and improved construction for a fastener or anchor, useful for attaching objects to a structure composed of a strong, solid material such as concrete and the like.

A more specific object of the invention is to provide a fastener having a two-stage thread construction wherein the first stage has a dual thread providing stability to the fastener as it enters a bore in the concrete and a second stage having a single thread of a pitch providing space for concrete particles dislodged as the fastener taps into the bore.

A further object of the invention is to provide a fastener useful for attaching objects to a structure wherein the fastener has substantial pullout resistance.

Another object of the present invention is to provide a fastener having radial notches constructed so as to be able to cleanly cut the material of a bore periphery.

An additional object of the present invention is to provide a fastener which provides greater stability of entry of the fastener into a bore as compared with other, currently available fasteners.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements, and wherein.

DETAILED DESCRIPTION OF A PREFERRED EMBODIMENT

Figure 1:
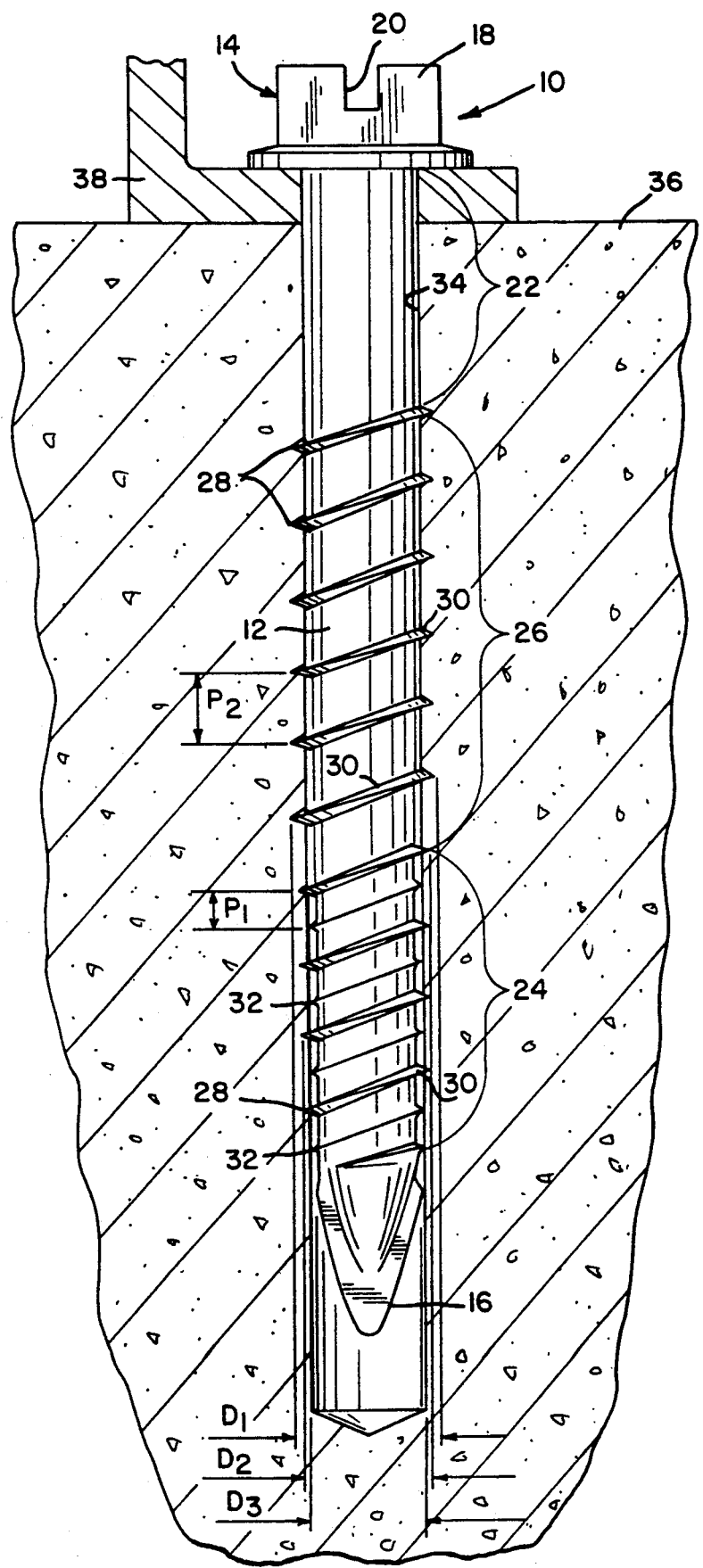
FIG. 1 is a side elevational view of a fastener, constructed according to the teachings of the present invention, showing the unique construction thereof.

As shown in FIG. 1 the fastener 10 of the invention includes a generally cylindrical shank 12 having a driving head 14 on one end and an entering point 16 on the other end. The head 14 includes driving surfaces 18 for driving engagement by a wrench and a transverse slot 20 for receiving a screw driver. The point 16 of the fastener may be configured as a so-called "X-point" of known construction as shown for example in U.S. Pat. No. 4,693,654.

The shank 12 of the fastener includes a smooth unthreaded portion 22 extending from adjacent the head 14 some distance along the shank. The fastener further includes a threaded portion consisting of a first stage 24 and a second stage 26 disposed successively along the shank between the point 16 and unthreaded portion 22. The details of the first and second threaded stages will now be described.

A first thread 28 is disposed on the shank from adjacent to point 16 continuously to the unthreaded shank portion 22. It will thus be seen that the thread 28 extends along both the first and second stages 24 and 26. The thread 28 gradually increases in diameter as the thread extends from the point 16 toward the portion 22 and is of constant pitch along its length.

The thread 28 is preferably sharp-crested as shown and includes a plurality of cutting notches 30 defined therein at spaced intervals along the thread.

The fastener includes a second thread 32 disposed along the shank from adjacent to point 16 and terminates near the midpoint of the first thread 28 so as to define the first stage 24 of the fastener as above mentioned. The thread 32 is disposed midway between the crests of the first thread 28 and has a constant pitch the same as that of the first thread 28. It will be seen that the thread 32 has a substantially constant diameter along its length and which diameter is substantially less than that of the first thread 28. It will thus be seen that the first stage 24 is defined by the conjoint extent of both threads 28 and 32 and the second stage 26 is defined by the remaining extent of the first thread 28 only.

The fastener 10 of the invention is designed to be rotatably driven into a bore 34 defined in a wall 36 of concrete or masonry to secure a fitting 38 to the wall. As the fastener enters the bore 34, the multi-diameter relationship of the threads 28 and 32 defining the first stage 24 stabilizes and centers the fastener relative to the bore and insures that the fastener will be received coaxially into the bore. As the fastener turns further into the bore, particulate is cut by the threads of the first stage and begins to collect between the threads. If this were permitted to continue, the particulate could jam between the threads and interfere with complete insertion into the bore. However the relatively greater pitch of the thread in the second stage 26 serves as a reservoir or collecting area for the particulate being generated as insertion continues. Accordingly the particulate is moved into this reservoir and does not hamper insertion of the fastener.

The notches 30 of the first thread 28 gradually chip and remove particulate from the bore permitting the thread to be firmly embedded into the bore. The gradually increasing diameter of the thread 28 also increases the holding power of the fastener as it is driven completely into the bore. For ultimate holding power there is a desirable relationship among the diameters $D_1$ and $D_2$ of the threads 28 and 32 respectively and the diameter $D_3$ of the hole 34, as shown in FIG. 1. The diameter $D_1$ of the thread 28 permits it to cut into the concrete to establish the principal holding force. The thread 32 cuts into the concrete to a lesser extent as shown.

The relationship between the first and second stages can be viewed in the context of the relative pitch of the threads within each stage. In the first stage 24 the pitch P1 is established by the adjacent thread crests as shown in FIG. 1. In the second stage 26, the pitch P2 is about twice that of P1 due to the absence of an intermediate thread in the second stage.

By the foregoing it will be seen that the fastener of the invention is simple in design, easy to manufacture, and provides advantages over prior designs to achieve the objects of the invention.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

What is claimed is:

1. A fastener for threadedly tapping a bore, defined within a substrate and having a predetermined diameter, so as to secure a member to said substrate, comprising:
   a cylindrical shank having a constant diameter, with a head portion defined upon one end of said cylindrical shank and a tapered point defined upon an opposite end of said cylindrical shank;
   a first thread of uniform pitch extending along the length of said cylindrical shank from said tapered point toward said head portion for a predetermined axial length; and
   a second thread of uniform pitch extending along said cylindrical shank from said tapered point to a point which is substantially midway of said predetermined axial length of said first thread so as to define with said first thread a first threaded stage;
   said second thread having a diameter which is slightly greater than said predetermined diameter of said bore of said substrate so as to engage sidewall portions of said bore of said substrate and thereby center and stabilize said cylindrical shank of said fastener as said second thread also begins to tap said bore of said substrate, and said first thread has a diameter which is greater than said diameter of said second thread so as to finalize said tapping of said bore of said substrate, the portion of said first thread extending beyond the termination of said second thread at said midway point of said first thread defining a second threaded stage serving to accommodate particulate matter dislodged from said sidewall portions of said bore of said substrate during said tapping process so as to permit said fastener to be fully driven into tapped engagement within said bore of said substrate without jamming of said fastener due to said dislodged particulate matter.

2. The subject matter of claim 1, wherein the thread within said second shape has a pitch greater than that of the threads defining said first stage.

3. The subject matter of claim 2, wherein the thread pitch within the second stage is generally twice the thread pitch within the first stage.

4. The subject matter of claim 1, wherein the shank is of uniform diameter along substantially its entire length and wherein said first thread has a diameter which gradually increases from the point toward the head of the fastener thereby increasing the holding power of the fastener.

5. A fastener as set forth in claim 1, wherein:
   said uniform pitch of said first is equal to said uniform pitch of said second thread; and
   said second thread is interposed between successive pitch portions of said first thread such that successive pitch portions of said second thread alternate with said successive pitch portions of said first thread along said axial length of said first thread within said first threaded stage.

6. A fastener for threadedly tapping a bore, defined within a substrate and having a predetermined diameter, so as to secure a member to said substrate, comprising:
   a cylindrical shank having a constant diameter, a head portion formed upon one end of said cylindrical shank, a tapered point formed upon an opposite end of said cylindrical shank, a threaded portion defined upon said cylindrical shank so as to be disposed adjacent to said tapered point, and an unthreaded portion defined upon said cylindrical shank so as to be disposed adjacent to said head portion;
   said threaded portion having a first thread of uniform pitch extending along the entire length of said threaded portion, and a second thread of uniform pitch disposed intermediate said first thread and extending along only a portion of said entire length of said threaded portion so as to define with said first thread a first stage of said threaded portion, said second thread having a diameter which is slightly greater than said predetermined diameter of said bore of said substrate so as to engage sidewall portions of said bore of said substrate and thereby center and stabilize said cylindrical shank of said fastener as said second thread also begins to tap said bore of said substrate, and said first thread has a diameter which is greater than said diameter of said second thread so as to finalize said tapping of said bore of said substrate, the portion of said first thread extending beyond the termination of said second thread within said threaded portion defining a second threaded stage serving to accommodate particulate matter dislodged from said sidewall portions of said bore of said substrate during said tapping process so as to permit said fastener to be fully driven into tapped engagement within said bore of said substrate without jamming of said fastener due to said dislodged particulate matter.

7. A fastener as set forth in claim 6, wherein:
   said uniform pitch of said first thread is equal to said uniform pitch of said second thread.

8. A fastener as set forth in claim 6, wherein:
   said portion of said first thread disposed within said second threaded stage has a pitch which is greater than the pitch of said threaded portion comprising said first threaded stage.

9. A fastener as set forth in claim 8, wherein:
   said pitch of said second threaded stage is twice the pitch of said first threaded stage.

10. A fastener as set forth in claim 6, wherein:
    said diameter of said first thread gradually increases in the direction extending from said tapered point toward said head portion of said fastener thereby increasing the holding power of said fastener.

11. The subject matter of claim 6, wherein said first stage extends along the shank substantially one half the length of the threaded portion.

12. In combination, a substrate, and a fastener for threadedly tapping a bore, defined within said substrate and having a predetermined diameter, so as to secure a member to said substrate, said fastener comprising:

a cylindrical shank having a constant diameter, with a head portion defined upon one end of said cylindrical shank and a tapered point defined upon an opposite end of said cylindrical shank;

a first thread of uniform pitch extending along the length of said cylindrical shank from said tapered point toward said head portion for a predetermined axial length; and a second thread of uniform pitch extending along said cylindrical shank from said tapered point to a point which is substantially midway of said predetermined axial length of said first thread so as to define with said first thread a first threaded stage;

said second thread having a diameter which is slightly greater than said predetermined diameter of said bore of said substrate so as to engage sidewall portions of said bore of said substrate and thereby center and stabilize said cylindrical shank of said fastener relative to said bore of said substrate as said second thread also begins to tap said bore of said substrate, and said first thread has a diameter which is greater than said diameter of said second thread so as to finalize said tapping of said bore of said substrate, the portion of said first thread extending beyond the termination of said second thread at said midway point of said first thread defining a second threaded stage serving to accommodate particulate matter dislodged from said sidewall portions of said bore of said substrate during said tapping process so as to permit said fastener to be fully driven into tapped engagement within said bore of said substrate without jamming of said fastener due to said dislodged particulate matter.

13. The combination as set forth in claim 12, wherein:
said diameter of said first thread gradually increases in the direction extending from said tapered point toward said head portion of said fastener.

14. The combination as set forth in claim 12, wherein:
said uniform pitch of said first thread is equal to said uniform pitch of said second thread; and
said second thread is interposed between successive pitch portions of said first thread such that successive pitch portions of said second thread alternate with said successive pitch portions of said first thread along said axial length of said first thread within said first threaded stage.

15. The combination as set forth in claim 12, wherein:
said substrate comprises concrete.

16. The combination as set forth in claim 12, wherein:
said substrate comprises masonry.

17. The combination as set forth in claim 12, wherein:
the pitch of said threads comprising said second stage is greater than the pitch of said threads comprising said first stage.

18. The combination as set forth in claim 17, wherein:
said pitch of said second stage threads is twice said pitch of said first stage threads.

* * * * *